No. 793,889. PATENTED JULY 4, 1905.
J. C. MARTIN, Jr.
VALVE DEVICE.
APPLICATION FILED FEB. 12, 1904.
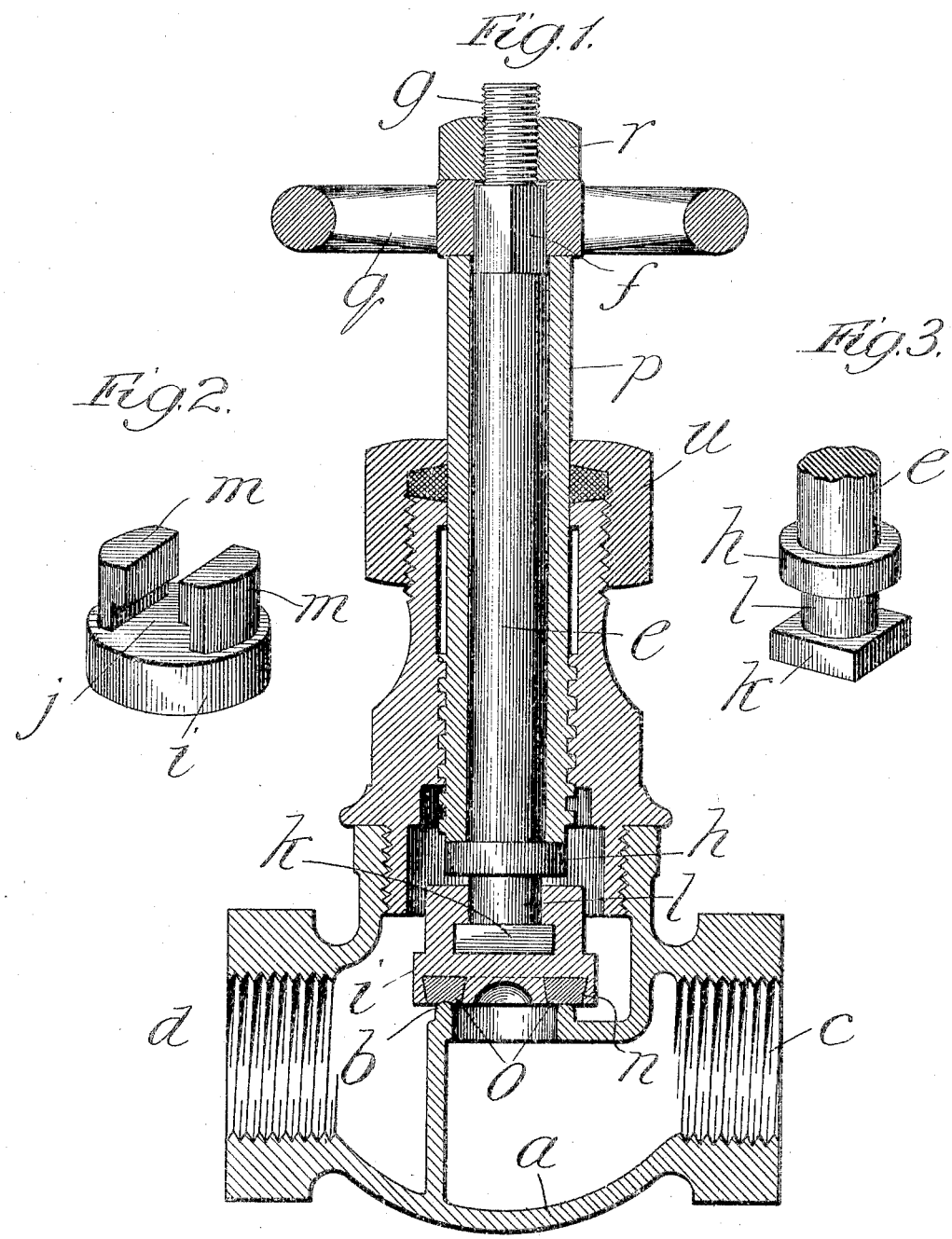

No. 793,889.

Patented July 4, 1905.

UNITED STATES PATENT OFFICE.

JESSE C. MARTIN, JR., OF SAN FRANCISCO, CALIFORNIA.

VALVE DEVICE.

SPECIFICATION forming part of Letters Patent No. 793,889, dated July 4, 1905.

Application filed February 12, 1904. Serial No. 193,299.

*To all whom it may concern:*

Be it known that I, JESSE C. MARTIN, Jr., a citizen of the United States, residing at San Francisco, in the county of San Francisco and State of California, have invented a new and useful Improvement in Valve Devices, of which the following is a specification.

This invention relates to an improvement in the class of valve devices in which the valve proper is adapted to be rotated while in frictional contact with its raised seat against the latter for the purpose of regrinding the valve when its seating action becomes impaired with use to cause it to seat properly.

The object of the invention is to provide a novel construction of valve device in the class referred to which shall render it peculiarly practical to manufacture and convenient and desirable for use.

Referring to the accompanying drawings, Figure 1 is a view of the improved valve device in vertical sectional elevation; Fig. 2, a perspective view of the valve proper in its preferred form of a separable attachment of the valve-stem, and Fig. 3 a broken perspective view of the inner shouldered end of the rotary valve-stem proper.

For the purpose of illustration the globe-valve variety of valve device is selected as the medium for the application of the improvement, though the latter is equally applicable to other forms of valve devices.

At $a$ is shown the valve-shell, containing a raised annular seat $b$ between its ports $c$ and $d$. The stem $e$ is provided on its outer end with a square or angular section $f$, having a threaded extension $g$, and on its inner end this stem is provided with a shoulder $h$, beyond which it carries the valve-head $i$, (shown of disk form.) It is preferred to provide the valve $i$ as an attachable and detachable element of the structure, and to that end it is shown to be formed with a recess $j$ on its back, at which it may be slipped on and off a rectangular head $k$ on the inner end of the stem $e$ beyond a neck portion $l$, which is embraced by the lugs $m$ on the disk, between which the recess $j$ is formed. The face of the disk valve or at least its seating portion should be of material relatively softer than that forming the valve-seat $b$, and this may be accomplished by letting into an annular groove $n$ in the face of the valve a relatively soft metal or composition or other suitable material $o$. Upon the stem $e$ is slipped a sleeve $p$, extending between the shoulder $h$, against which it abuts, and a handle is shown in its preferred form of a wheel $q$, fitting the squared section $f$ of the stem and adapted to be tightened against the outer end of the sleeve $p$ by a nut $r$ on the extension. The sleeve $p$ is provided toward its inner end with an external thread $s$, at which it engages with a corresponding internal screw-thread, as shown, in the bonnet $t$ or tubular extension of the casing, which screws into the casing $a$ and has screwed upon its outer end the packing-nut $u$, which, as well as the bonnet and the valve-disk and casing, need involve no features of novelty.

By the construction thus described in the normal condition of the parts the stem $e$ and sleeve $p$ are rendered practically one and constitute together the valve-stem by screwing the nut $r$ on the extension $g$ against the hand-wheel, whereby the latter forces the sleeve $p$ against the shoulder $h$ on the inner stem $e$ and the inner stem is drawn outward to bind its shoulder against the inner end of the sleeve. Thus the two parts $e$ and $p$ of the valve-stem are united, so that by turning the handle $q$, which is on the squared section $f$ of the stem and therefore non-rotatable independently thereof, the two parts of the stem are rotated together, and the thread on the sleeve causes it to be screwed inward or outward, according to the direction of turning the handle, to move against or away from its seat $b$ the valve $i$, which turns with the stem.

When the valve $i$ requires regrinding to bed it against its seat, it is screwed tightly against the latter by turning the wheel in the proper direction with the stem $e$ and sleeve in their mutually interlocked condition last described, and when the valve has thus been brought tightly against its seat the nut $r$ is loosened, thereby freeing the wheel $q$ and sleeve $p$ from each other, while the thread on the sleeve maintains it at its inner end tight against the shoulder $h$ to bind the valve against the seat $b$. With the wheel thus free turning it effects turning of the inner stem $e$ and of the valve $i$ against its seat without turning the sleeve, which therefore remains undisturbed in its position of holding down the valve, and by thus turning the valve on its seat the latter beds itself in and regrinds the valve-face to repair the imperfection in its seating action. In this way the regrinding operation may readily be performed under full boiler-pressure. After the valve has been reground the nut $r$ is again tightened to adapt the valve to be opened and closed by turning the hand-wheel.

As will be understood the purpose of the attachable and detachable construction of the valve-disk $i$ is to adapt it to be replaced when worn out by a new disk instead of requiring the replacement of an entire new stem $e$, as would then be required if the valve were integral with it.

While not essential, it is important that the junction between the wheel $q$ and stem $e$ should be angular instead of cylindrical, since thereby when the nut is being loosened the stem $e$ may be held at the hand-wheel against turning. Moreover, the details of construction may be otherwise modified without departure from the invention, which is therefore not intended to be limited to the precise form and arrangement thereof herein shown and described.

What I claim as new, and desire to secure by Letters Patent, is—

1. In a valve device, the combination of a casing containing a valve-seat and provided with an internally-threaded tubular extension, a valve, a valve-stem shouldered near its inner end and having near its outer end an angular portion and a threaded portion beyond the latter equipped with a nut, a handle having an angular opening in invariable engagement with the angular portion of the stem and arranged to be engaged by the nut, and a threaded sleeve about the stem and screwing into said tubular extension and releasably confined endwise between said handle and shoulder.

2. In a valve device, the combination of a casing containing a valve-seat and provided with an internally-threaded tubular extension, a stem having an angular head on its inner end and near said end a shoulder and having near its outer end an angular portion and a threaded portion beyond the latter equipped with a nut, a disk valve provided in its back with a recess at which it separably engages with said head, a handle having an angular opening in permanent engagement with the angular portion of the stem, said handle being engaged by said nut, and a threaded sleeve about the stem and screwing into said tubular extension and releasably confined endwise between said handle and shoulder.

JESSE C. MARTIN, Jr

In presence of—
CHARLES EDELMAN,
W. F. FRASER.